United States Patent

[11] 3,600,988

| [72] | Inventor | Kenneth J. Davis |
| --- | --- | --- |
| | | Warren, Mich. |
| [21] | Appl. No. | 839,575 |
| [22] | Filed | July 7, 1969 |
| [45] | Patented | Aug. 24, 1971 |
| [73] | Assignee | Lear Siegler, Inc. |
| | | Santa Monica, Calif. |

[54] MULTIPLE ADJUSTABLE STOCK
6 Claims, 3 Drawing Figs.

[52] U.S. Cl............................................. 82/31, 51/165
[51] Int. Cl............................................. B23b 23/00
[50] Field of Search........................................ 82/31; 51/165

[56] References Cited
UNITED STATES PATENTS

| 1,369,152 | 2/1921 | Witt | 82/31 X |
| --- | --- | --- | --- |
| 2,414,861 | 1/1947 | Evans | 82/31 |
| 2,607,105 | 8/1952 | Barkus | 82/31 X |

FOREIGN PATENTS

| 842,146 | 6/1952 | Germany | 82/31 |
| --- | --- | --- | --- |

*Primary Examiner* — Leonidas Vlachos
*Attorney* — Whittemore, Hulbert & Belknap

ABSTRACT: Means for adjusting one of a pair of stocks both vertically and laterally to bring it into exact alignment with the other stock.

INVENTOR.
KENNETH J. DAVIS
BY Whittemore,
Hulbert & Belknap
ATTORNEYS

MULTIPLE ADJUSTABLE STOCK

BRIEF SUMMARY OF THE INVENTION

In many cases where a pair of stocks such as a headstock and tailstock are adapted to support a work piece, minor misalignment between the axes of the head and tail stocks results in malformation of the work. In accordance with the present invention one of the stocks includes means for effecting very slight vertical adjustment and very slight horizontal adjustment transverse to the axis of one of the stocks to bring it into exact alignment with the other stock. This is accomplished specifically by providing an upper support plate and an intermediate adjusting plate on a base plate. The intermediate plate is slightly tapered so that movement thereof produces vertical adjustment of the upper support plate. A key is provided intermediate the upper support plate and the intermediate plate, the key having portions received in keyways formed in the adjacent surfaces of the plates, the keys extending at a very small angle to each other so that movement of the key produces transverse adjustment of the upper support plate.

DETAILED DESCRIPTION

Figure 1:
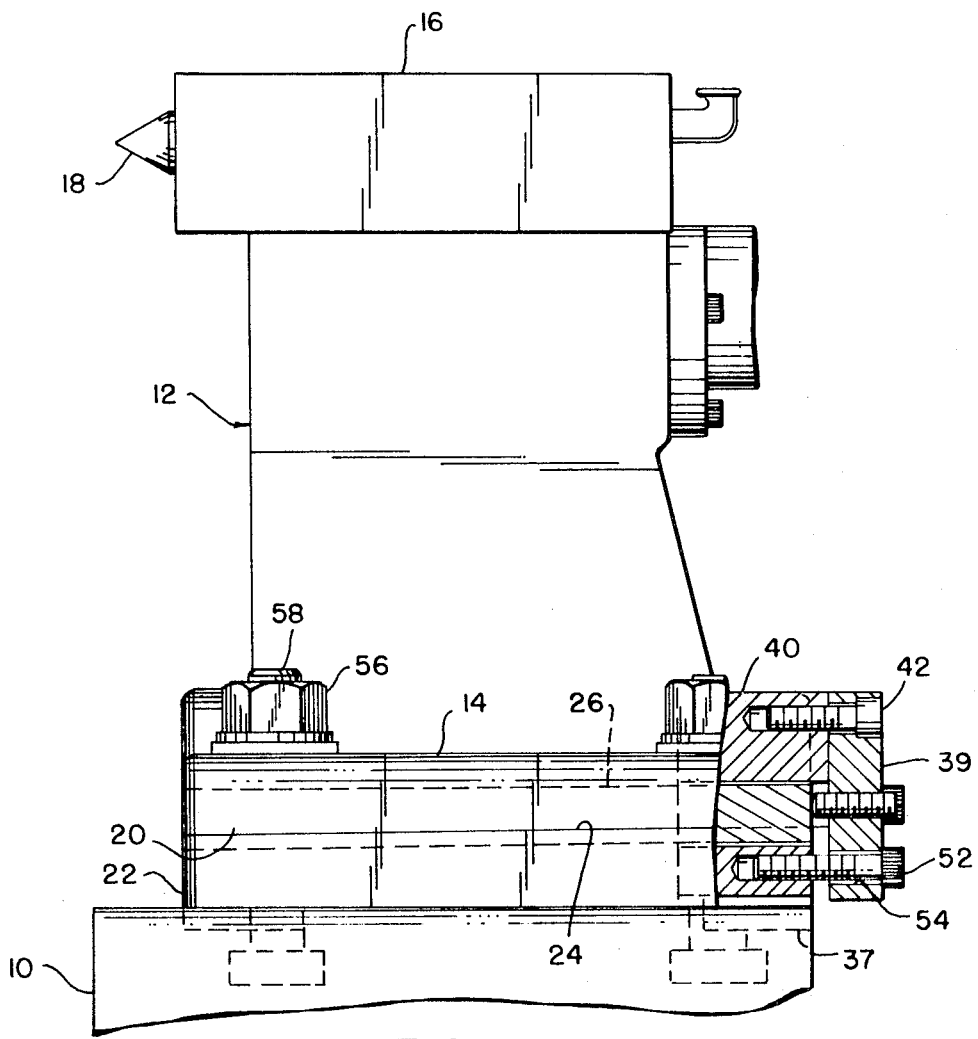
FIG. 1 is a side elevation of the adjustable stock with parts broken away.

Referring to the drawings there is illustrated the table 10 of a machine tool which is adapted to support a stock 12 including a casting having a bottom support plate 14 and an upper portion 16 which carries a spindle having a center 18.

It is an object of the present invention to provide for vertical adjustment of the stock 12 and lateral adjustment thereof horizontally so as to bring the axis of the center 18 into exact alignment with the axis of the cooperating stock provided on the table.

For this purpose the undersurface 20 of the plate 14 is inclined as best seen in FIG. 1, this inclination being upwardly and to the right as viewed in this Figure. Intermediate the table 10 and the support plate 14 of the stock is an adjustment plate 22, the upper surface 24 of which is inclined to conform to the inclination of the bottom surface 20 of the support plate 14. Accordingly, it will be observed that if the adjustment plate 22 is shifted to the right relative to the table 10 and the support plate 14, the stock 12 will be moved vertically downwardly.

Figure 3:
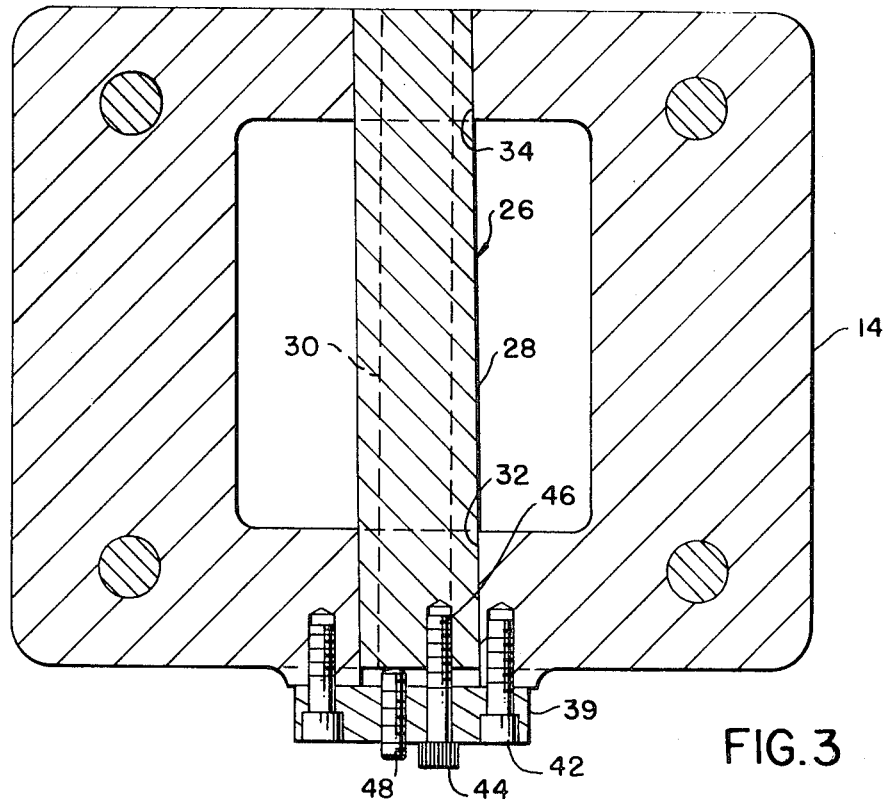
FIG. 3 is a sectional view on the line 3–3, FIG. 2.
Figure 2:
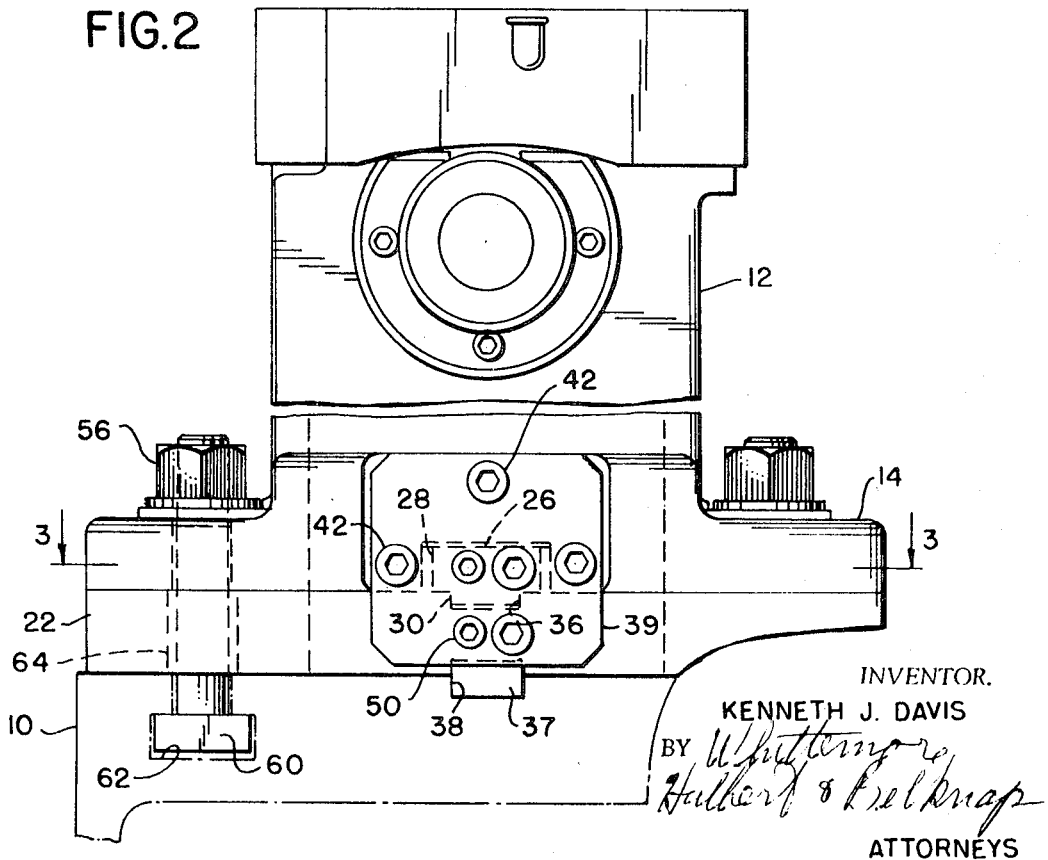
FIG. 2 is a rear elevation of the stock as viewed from the right in FIG. 1.

Intermediate the support plate 14 of the stock and the adjustment plate 22 there is provided a transverse adjusting key 26. The key as best seen in FIG. 2, has an upper relatively wide portion 28 and a lower relatively narrow portion 30. The upper portion 28 as best seen in FIG. 3, extends longitudinally at a very slight angle with respect to the narrower lower portion 30. The upper portion 28 of the adjustment key 26 extends through aligned openings 32 and 34 in the support plate 14. Similarly, the narrower portion 30 of the key extends in a longitudinal guiding groove 36 provided in the upper surface of the adjusting plate 22. Accordingly, as the key 26 is shifted longitudinally it will effect relative transverse adjustment between the adjusting plate 22 and the stock support plate 14 while maintaining the orientation of the stock without change so that the axis of the spindle extends always in the same direction.

Movement of the adjustment plate 22 horizontally in the direction of the axis of the center 18 is guided by keys 37 received in corresponding keyways 38 provided in the upper surface of the table 10. Accordingly, horizontal movement of the adjustment plate in a direction parallel to the axis of the center 18 and the spindle connected thereto will effect horizontal movement of the stock in a direction perpendicular to the axis of the center 18.

In order to accomplish the relatively small and accurately controlled adjustments just referred to, means accessible at the rear of the stock is provided. This means comprises a bracket 39 bolted to an upwardly extending boss 40 provided on the stock support plate 14 by the bolts indicated at 42.

In order to effect longitudinal movement of the adjusting key 26 the bracket 39 is provided with an opening through which an adjusting screw 44 extends, the inner end 46 thereof having threaded engagement in a tapped hole in the adjacent end of the key. The bracket 39 also carries an adjustable threaded abutment screw 48. To effect a predetermined adjustment of the key 26 upwardly as seen in FIG. 3, the screw 44 is loosened a predetermined amount and the abutment screw 44 is advanced a corresponding amount to shift the key until the head of the screw 44 engages the bracket 39. Conversely, to effect downward movement of the key as viewed in FIG. 3, the abutment screw 48 is retracted after which the adjusting screw 44 is turned clockwise to draw the key 26 toward the screw 48. Downward movement of the key 26 as viewed in FIG. 3, will cause a camming adjustment of the stock 12 to the left as seen in FIG. 3.

In order to effect vertical movement of the stock 12 the bracket 39 is provided with a second abutment screw 50 the inner end of which engages the adjacent edge of the adjustment plate 22. Cooperating with the abutment screw 50 is a headed adjustment screw 52 which extends through an opening 54 in the bracket 39 and is threaded into a recess in the adjustment plate 22. Accordingly, adjustment of the plate 22 to the right as seen in FIG. 1 is accomplished by first retracting the abutment screw 50 and thereafter drawing the plate to the right by clockwise rotation of the adjustment screw 52. This will result in downward movement of the stock 12.

After the necessary adjustments have been made on the stock 12 it is clamped in adjusted position by tightening nuts 56 provided on screws 58 having heads 60 received in T-slots 62. The necessary clearance to permit adjustment of the intermediate adjustment plate 22 relative to the table 10 and support plate 14 of the stock is provided and is indicated at 64 in FIG. 2.

What I claim as my invention is:

1. A machine tool having a table, head and tail stocks provided with centers mounted on said table, means for adjusting one of said stocks vertically and horizontally laterally to provide exact alignment between the stocks, the adjusting means comprising an adjustment plate between the table and stocks, the adjustment plate being tapered, the lower surface of the stock resting on the upper surface of the plate, means for effecting vertical adjustment of the stock by moving said plate horizontally relative both to said table and said stock, guide means between said table and adjustment plate parallel to the axis of the center thereof, an elongated adjusting key intermediate said adjustment plate and said stock, said key having elongated key portions disposed at a slight angle with respect to each other, and guide means acting between said plate and one of said key portions and between said stock and the other of said key portions, one of said key portions extending at least generally in the direction of the axis of said stock, and means for effecting longitudinal adjustment of said key relative to said plate and said stock.

2. A machine tool table, a tapered adjustment plate on said table, a guide key acting between said table and plate and limiting motion of said plate on said table to the direction of taper of the plate, a stock on said guide plate having a center whose axis is parallel to the guide key acting between said table and plate, an elongated adjustment key having upper and lower key portions disposed at a slight angle to each other, keyways in the upper surface of said plate and the bottom surface of said stock receiving said key portions, and adjusting means mounted on said stock and acting on said adjustment plate and adjustment key to effect adjusting movement thereof relative to said stock whereby to adjust said stock vertically and laterally with respect to said table.

3. Structure as defined in claim 2 in which the adjusting means comprises a bracket on said stock, and an adjustable abutment screw and adjusting screw carried by said bracket and operable on said plate.

4. Structure as defined in claim 3 comprising a second adjustable abutment screw and adjusting screw carried by said bracket and operable on said adjustment key.

5. A machine tool having a table, a stock supported on said table an laterally adjustable with reference thereto, means for supporting the stock for lateral adjustment without change of orientation of the stock comprising confronting support surfaces one of which is at the underside of said stock, crossing straight grooves in said surfaces extending at a small angle with respect to each other, a key having elongated straight elongated crossing guide portions received respectively in said grooves, and means for effecting longitudinal movement of said key to effect lateral adjustment of said stock.

6. A machine tool as defined in claim 5 in which said stock is provided with a rotary spindle, and one of said grooves and the key guide portion therein extends parallel to the axis of said spindle.